US011117522B2

(12) United States Patent
Wieczorek et al.

(10) Patent No.: US 11,117,522 B2
(45) Date of Patent: Sep. 14, 2021

(54) POSITIONING SYSTEM WITH ONE OR MORE GEAR ROD AND SPRING JACK FOR A REAR VIEW DISPLAY DEVICE

(71) Applicant: SMR Patents S.à.r.l., Luxembourg (LU)

(72) Inventors: Romeo Wieczorek, Esslingen (DE); Artem Rudi, Ludwigsburg (DE)

(73) Assignee: SMR Patents S.à.r.l., Luxembourg (LU)

( * ) Notice: Subject to any disclaimer, the term of this patent is extended or adjusted under 35 U.S.C. 154(b) by 121 days.

(21) Appl. No.: 15/559,757

(22) PCT Filed: May 2, 2017

(86) PCT No.: PCT/EP2017/060415
§ 371 (c)(1),
(2) Date: Sep. 19, 2017

(87) PCT Pub. No.: WO2017/191132
PCT Pub. Date: Nov. 9, 2017

(65) Prior Publication Data
US 2019/0054859 A1 Feb. 21, 2019

(30) Foreign Application Priority Data

May 4, 2016 (DE) .......................... 102016108373.9

(51) Int. Cl.
*B60R 1/072* (2006.01)
*B60R 11/04* (2006.01)
(Continued)

(52) U.S. Cl.
CPC .............. *B60R 1/072* (2013.01); *B60R 11/04* (2013.01); *G02B 7/1827* (2013.01); *B60R 11/0229* (2013.01)

(58) Field of Classification Search
CPC ..... B60R 1/072; B60R 11/04; B60R 11/0229; G02B 7/1827
See application file for complete search history.

(56) References Cited

U.S. PATENT DOCUMENTS 4,670,679 A * 6/1987 Koot ....................... B60R 1/072
192/20
4,678,295 A * 7/1987 Fisher ..................... B60R 1/072
359/874
(Continued)

FOREIGN PATENT DOCUMENTS

EP 0173433 A1 5/1986
EP 0316055 A1 5/1989
(Continued)

OTHER PUBLICATIONS

International Search Report dated Jul. 6, 2017, in corresponding International Application No. PCT/EP2017/060415.
(Continued)

*Primary Examiner* — Walter Yehl
(74) *Attorney, Agent, or Firm* — Jones Day

(57) ABSTRACT

A positioning system for a rear view display device includes at least a first gear rod for positioning a cover plate, a second gear rod for positioning the cover plate, a spring jack, and a position sensing means. The first gear rod, the second gear rod, and the spring jack may include conductive material. The spring jack may be adapted to contact the first gear rod and the second gear rod. The position sensing means may be adapted to sense the position of the first gear rod relative to the spring jack with at least a first resistance value of a first conductive path between at least a first point on the first gear rod and the spring jack varying with the position of the first gear rod relative to the spring jack.

17 Claims, 3 Drawing Sheets

(51) Int. Cl.
*G02B 7/183* (2021.01)
*B60R 11/02* (2006.01)
*G02B 7/182* (2021.01)

(56) References Cited

U.S. PATENT DOCUMENTS

| | | | |
|---|---|---|---|
| 4,856,885 A * | 8/1989 | Fimeri | B60R 1/072 |
| | | | 359/874 |
| 5,900,999 A * | 5/1999 | Huizenga | B60R 1/072 |
| | | | 359/877 |
| 6,650,080 B1 | 11/2003 | Guttenberger | |
| 7,090,363 B1* | 8/2006 | Boddy | B60R 1/072 |
| | | | 359/872 |
| 2002/0003571 A1* | 1/2002 | Schofield | B60R 11/0235 |
| | | | 348/148 |
| 2005/0128612 A1 | 6/2005 | Ro | |
| 2009/0021034 A1* | 1/2009 | Tilg | B60R 1/072 |
| | | | 296/1.11 |
| 2011/0222176 A1* | 9/2011 | Browne | B60R 1/074 |
| | | | 359/846 |

FOREIGN PATENT DOCUMENTS

| | | |
|---|---|---|
| EP | 2017127 B1 | 7/2007 |
| WO | 9924289 A1 | 5/1999 |

OTHER PUBLICATIONS

International Written Opinion in corresponding International Application No. PCT/EP2017/060415.

\* cited by examiner

POSITIONING SYSTEM WITH ONE OR MORE GEAR ROD AND SPRING JACK FOR A REAR VIEW DISPLAY DEVICE

BACKGROUND OF THE INVENTION

1. Field of the Invention

The following description relates to a positioning system for a rear view display device including at least a first gear rod for positioning a cover plate. The first gear rod may include conductive material; a spring jack including conductive material, where the spring jack is adapted to contact the first gear rod; and position sensing means adapted to sense the position of the first gear rod relative to the spring jack with at least a first resistance value of a first conductive path between at least a first point on the first gear rod and the spring jack varying with the position of the first gear rod relative to the spring jack. The following description also relates to a rear view display device for a vehicle including at least one positioning system, and to a vehicle including such a rear view display device.

2. Related Art

In modern day vehicles, positioning systems are used to pivot a reflective element installed on a cover plate about at least one orthogonal axis to adjust and re-adjust the orientation of the reflective element to the specific requirements of the vehicle driver. For example, EP 2 017 127 B1 and EP 1 805 061 B1 describe positioning systems for adjusting the orientation of a mirror for a vehicle. In WO 99/24289, a rear-view mirror apparatus with drive gears for adjusting the position of the mirror according to a control signal is disclosed, in which potentiometers are used to monitor the position of the mirror. U.S. Pat. No. 4,856,885 describes control means for controlling the orientation of a rear vision mirror of a motor vehicle, using a high resistance material in each of two separate and motor driven gear nuts employed to adjust the rear vision mirror. The position of the mirror is determined from the voltage on a conductive wiper, which is a function of the position of a screw shaft, effecting the rotation of the gear nut to a translation of the rear vision mirror, within the respective gear nut.

The position of the cover plate needs to be monitored, so that a change of the orientation of the cover plate, e.g. by an external mechanical influence, can be detected, so that the cover-plate can be re-adjusted by means of a so-called memory function. Solutions that employ electronic sensors have the disadvantage that they cannot reliably detect a change in orientation of the cover plate when the electronic sensors are not connected to the power line. Therefore, typically, mechanical solutions or electromechanical solutions are preferred for detecting a change in the orientation of the cover plate. This is because only these mechanical solutions or electromechanical solutions reliably convey position information to the memory function about the change of orientation of the cover plate that happened while the system was switched off when the system is re-powered again. For example, U.S. Pat. No. 4,915,493 describes such a sensing mechanism where a separate potentiometer component is employed for detecting a change in the orientate of the cover plate. The potentiometer is arranged in the positioning system such that the wiper contact of the potentiometer slides along a resistance element when the position of the cover plate is changed.

Unfortunately, the above mentioned solution that uses one or more separate potentiometers for detecting the orientation of the cover plate has the disadvantage that it makes the memory functionality rather expensive. The solution without using a potentiometer has a complex and large mechanical structure, preventing the usage of such a system in state of the art rearview devices.

Therefore, the invention aims at providing a simpler and cheaper positioning system that does not require separate potentiometers for detecting the orientation of the cover plate, while preserving the advantages of the positioning systems that utilize separate potentiometers.

SUMMARY OF THE INVENTION

In an aspect, a positioning system for a rear view display device includes at least a first gear rod for positioning a cover plate, where the first gear rod includes conductive material, and a second gear rod for positioning the cover plate, where the second gear rod includes conductive material; a spring jack including conductive material, where the spring jack is adapted to contact the first gear rod and the second gear rod; and position sensing means adapted to sense the position of the first gear rod relative to the spring jack with at least a first resistance value of a first conductive path between at least a first point on the first gear rod and the spring jack varying with the position of the first gear rod relative to the spring jack.

Here, the term "gear rod for positioning a cover plate" can be used to refer to a rod that is directly or indirectly connected to the cover plate for moving the cover plate. Also, the term "contacting" can be used to refer to mechanically and/or electrically contacting the first gear rod. The term "position sensing means" can be used to refer to a logic that provides the input voltage and senses the output voltage. However, this term can be also used to only refer to the wiring necessary to apply and detect the corresponding voltages.

In one embodiment, a first constant voltage is applied between the first point, preferably at least one end, of the first gear rod and the spring jack, and a resulting first variable current is determined as a function of the first constant voltage and the first resistance value to sense the position of the first gear rod. In another example, a first constant current is introduced between the first point, preferably at least one end, of the first gear rod and the spring jack, and a resulting first variable voltage is determined as a function of the first constant current and the first resistance value to sense the position of the first gear rod.

Here, the terms "constant voltage" and "constant current" can be used to refer to voltage and current values that are kept essentially constant during operation of the positioning system. The terms "variable current" and "variable voltage" can be used to refer to values that vary with the position of the gear rod relative to the spring jack.

The term "end" can be used to refer to a position that is located close to either one of the ends of the first gear rod.

In another embodiment, the position sensing means is adapted to sense a second variable voltage at the spring jack that is at least a fraction of a first constant voltage applied between two points on the first gear rod, preferably the first constant voltage is applied between two ends of the first gear rod. The second variable voltage may be detected at the spring jack being a fraction of the first constant voltage applied across the two points on the first gear rod, and the second variable voltage may be a function of the position of the first gear rod in respect to the spring jack.

In another embodiment, the first gear rod is adapted to pivot the cover plate around a first pivot axle, and the second gear rod is adapted to pivot the cover plate around a second pivot axle.

In yet another embodiment, a second constant voltage is applied between a second point, preferably at least one end, of the second rod and the spring jack, and the resulting second variable current is determined as a function of the second constant voltage and a second resistance value of a second conductive path between the second point on the second gear rod and the spring jack to sense the position of the second gear rod. In another example, a second constant current is introduced between the second point, preferably at least one end, of the second gear rod and the spring jack, and the resulting second variable voltage is determined as a function of the second constant current and the second resistance value to sense the position of the second gear rod.

In a further embodiment, the spring jack is kept (i) essentially stationary in regard to the movement of the first and/or the second gear rod, preferably the spring jack is located on a body, where the cover plate is kept pivotable relative to the body, and/or (ii) spring biased in regard to the first and/or second gear rod.

Here, the term "pivotable" can be used to describe an arrangement where the body having the spring jack installed thereon is fixed to a component of a vehicle, while the cover plate is pivotable about the body by means of adjusting the position of the first and/or second gear rod.

In yet another embodiment, the first and/or the second gear rod is/are attached to the cover plate, preferably pivotally attached to the cover plate and comprise/comprises a circular arc section.

In one embodiment, the positioning system further includes a first motor having a first gear adapted to interact with the first gear rack and/or a second motor having a second gear adapted to interact with the second gear rack for positioning the cover plate.

In one embodiment, the spring jack includes an essentially elastic conductive material, preferably the spring jack includes a steel spring, a steel spring having an alloy coating, a tapping having carbon material, and/or conductive plastic material.

In yet another embodiment, the first gear rack and/or the second gear rack include plastic material. Preferably, the plastic material is obtained by injection molding, and the plastic material includes an electrically conductive coating, preferably applied by a screen-printing or roll on technique. The electrically conductive coating may be cured after its application and/or the plastic material may include an electrically conductive material. Preferably, nanotubes and/or carbon particles may be dispersed evenly throughout the electrically conductive material so that the resistance of the first and/or the second gear rack changes essentially linearly along the respective lengths of the first and/or the second gear rack. Preferably, the amount of electrically conductive material leads to an internal resistance of the plastic material being sufficient for allowing measurements with millimeter precision.

In another embodiment, the first and/or the second gear rack include along their length a plurality of length units having a resistance value each. The resistance value of a length unit of the plurality of length units may be higher than the total resistance error of all length units of the plurality of length units. The total resistance error of all length units may be the sum of deviations from a predefined resistance value for each length unit of the plurality of length units.

Here, the term "length unit" can be used to refer to a section along the length of the first and/or the second gear rack having a certain length and a corresponding resistance value. For example, each length unit could be 1 mm long and could correspond to a resistance value of approximately 100Ω. Also, the term "predefined resistance value" can be used to refer to an ideal and/or theoretically value of a length unit having a certain length. Consequently, the term "deviation" can be used to refer to a difference between a measured resistance value and the predefined resistance value.

In one embodiment, the position sensing means is adapted to directly connect to an evaluation module, or includes a Printed Circuit board (PCB) and is adapted to be connected to a bus system. The bus system is preferably a Local Interconnect Network, LIN, Bus system and the connection may be via a corresponding interface.

In another embodiment, the cover plate is adapted to hold or is holding a reflective element, a mirror element, an electrochromic element, a prismatic element, a video screen, and/or a camera.

The following description also relates to a rear view display device for a vehicle, preferably for a motor vehicle, including at least one positioning system.

It is preferred that the rear view display device includes at least one camera and/or reflective element, in particular supported by at least one cover plate.

Also, the following description relates to a vehicle including at least one rear view device.

In principle the following description also relates to a positioning system for a rear view display device including: at least a first gear rod for positioning a cover plate. The first gear rod may include conductive material and a spring jack including conductive material. The spring jack may be adapted to contact the first gear rod. The first gear rod may further include position sensing means adapted to sense the position of the first gear rod relative to the spring jack with at least a first resistance value of a first conductive path between at least a first point on the first gear rod and the spring jack varying with the position of the first gear rod relative to the spring jack.

In at least one aspect, it has been advantageously found that the position of the at least one first gear rod and/or the position of the first and the second gear road correlates to the position of the cover plate so that by obtaining the current position of the gear rods the use of separate potentiometers can be made redundant.

Employing the spring jack to engage the gear rods with the respective gears of the respective motor, the clearance between the gear rods and the gears during movement of the rear rods is reduced, improving stability and durability, reducing maintenance and the number of needed parts all together in a very advantageous way.

In another aspect, a cheaper positioning system can be realized that does not require potentiometers as traditionally used, but that retains the advantages of the traditional positioning systems that employ potentiometers. Also, advantageously, the positioning system can be made smaller and lighter.

BRIEF DESCRIPTION OF THE DRAWINGS

The following schematic drawings show aspects of the invention for improving the understanding of the invention in connection with some exemplary illustrations, wherein.

DETAILED DESCRIPTION

Figure 1A:
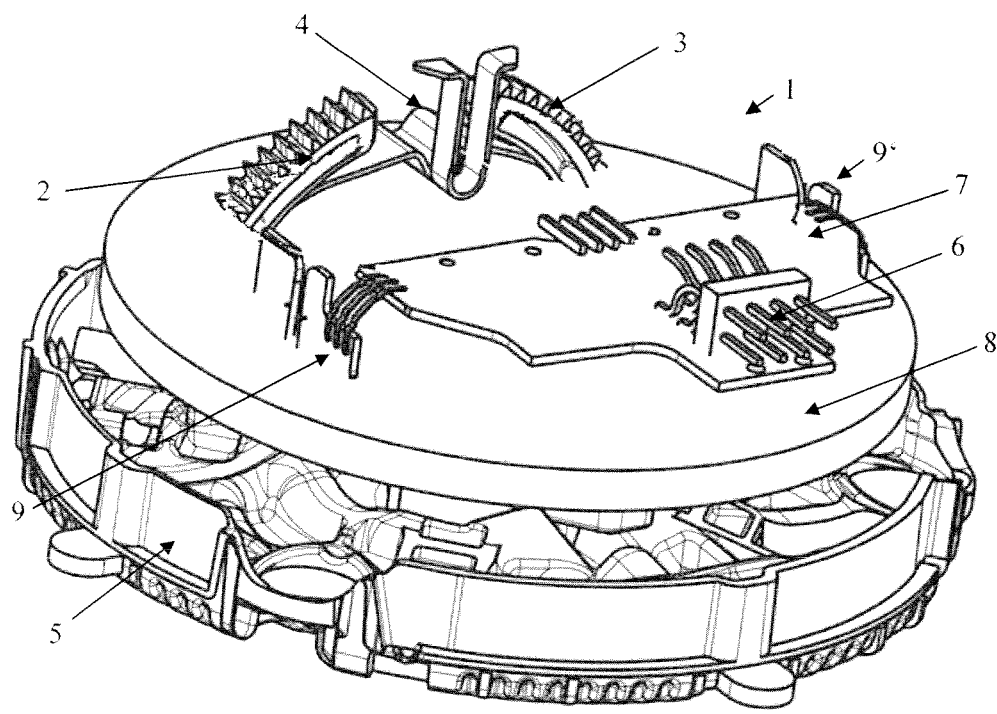
FIGS. 1a, 1b are diagrams illustrating a schematic view and a schematic detailed view of a prior art positioning system.
Figure 1B:
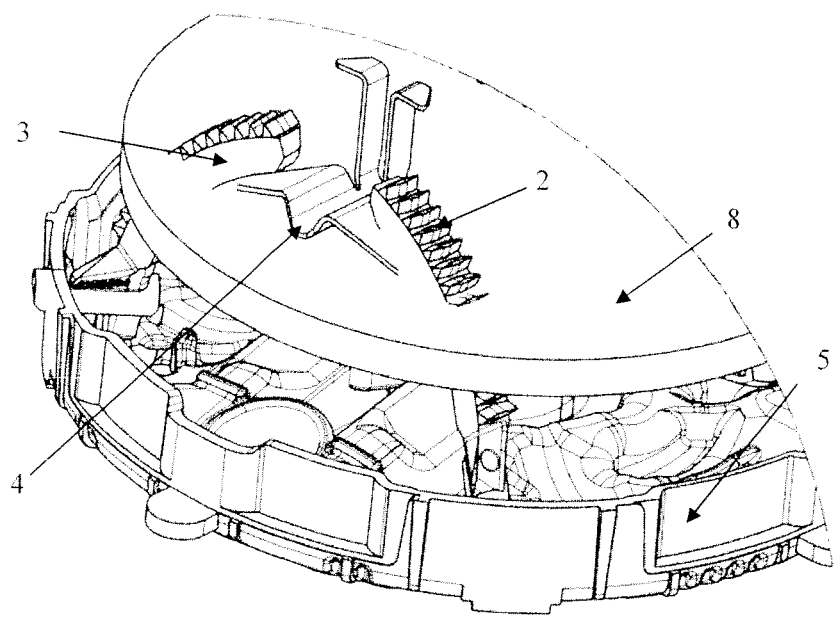

The prior art positioning system 1 which is illustrated in FIGS. 1a, 1b includes a first gear rod 2 and a second gear rod 3 that are shown as circular arc sections. The prior art positioning system 1 could be one of the positioning systems that are known from EP 2 017 127 B1 and EP 1 805 061 B1. As best shown in FIG. 1b, the first gear rod 2 and the second gear rod 3 are mechanically connected to a cover plate 5. In the shown example, the first gear rod 2 can pivot the cover plate 5 around a first pivot axle, for example in xy-direction, and the second gear rod 3 can pivot the cover plate 5 around a second pivot axle, for example in yz-direction, so that the cover plate 5 can swivel about the body 8. By means of two motors (not shown) that are arranged on the body 8 and having gears that engage with the corresponding gear racks of the first 2 and second 3 gear rods, respectively, the cover plate 5 can be tilted relative to the body 8 by rotation of the motor shafts.

A spring jack 4 arranged on the body 8 in form of a spring is also shown in FIGS. 1a, 1b. The spring jack 4 exerts a specific force onto the first gear rod 2 as well as onto the second gear rod 3. The purpose of the spring jack 4 is to press the first gear rod 2 and the second gear rod 3 against the corresponding gears of the motors to ensure that the gears of the motors always properly engage with the gear racks regardless of the position of the cover plate 5 relative to the body 8. This eliminates relative moving between the gearing of the first and second gear rods 2, 3 and the gears in operation condition. Therefore, when the cover plate 5 is tilted relative to the body 8, the spring jack 4 slides back and forth on the back side of the first 2 and second 3 gear rods.

In the prior art positioning system 1 that is shown in FIGS. 1a, 1b, potentiometers 9, 9' are used to detect a change in the orientation of the cover plate 5 relative to the body 8. In the prior art, the shafts of the potentiometers 9, 9' can be connected to the shafts of the motors to detect the angular positions of the motor shafts that are indicative of the present tilt angle of the cover plate 5. In the prior art example shown in FIGS. 1a, 1b, a so-called memory board in form of a PCB board 7 is arranged on the body 8 where the potentiometers 9, 9' are connected to. The PCB board 7 may include a logic for converting the current tilt angle of the cover plate 5 into electronic signals. The positioning system 1 can be connected to the vehicle control system via interface 6.

Figure 2A:
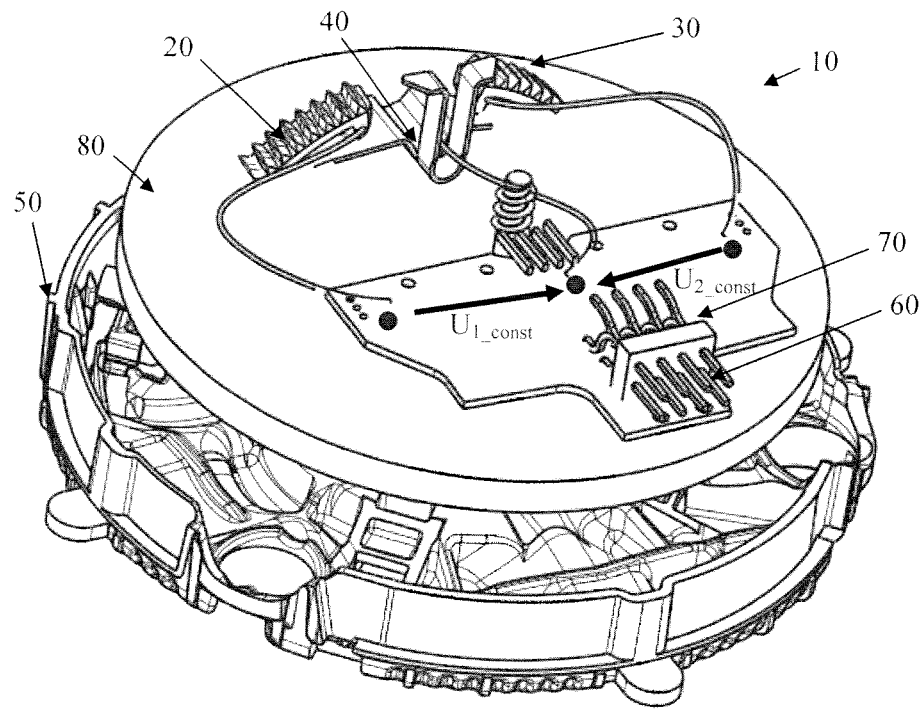
FIGS. 2a, 2b are diagrams illustrating schematic views of a positioning system according to a first embodiment of the invention.
Figure 2B:
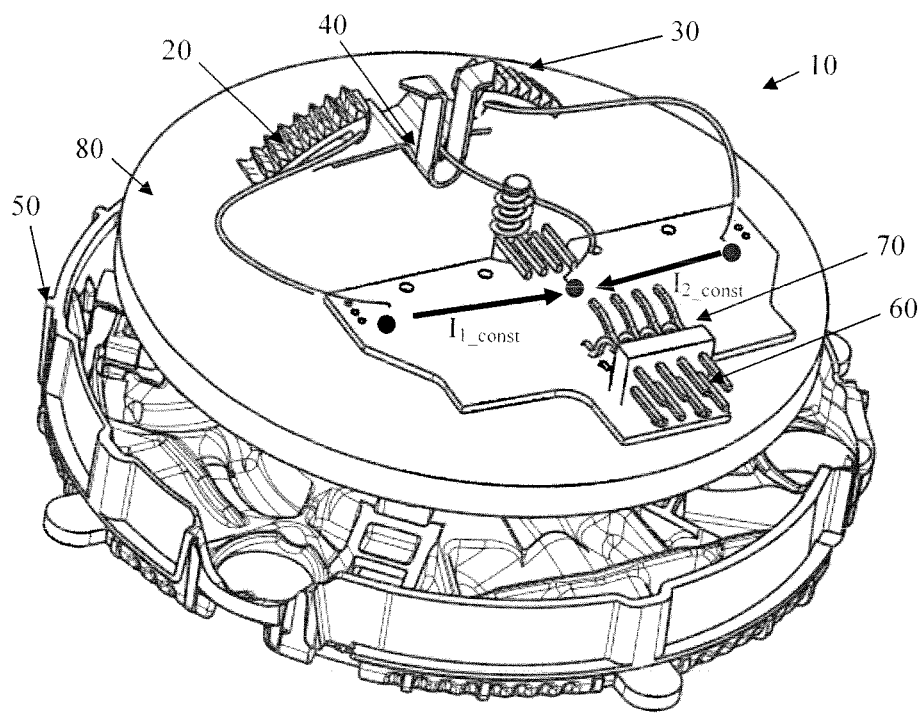

In FIGS. 2a and 2b schematic views of a positioning system 10' according to a first embodiment is shown. The positioning system could essentially correspond to the positioning system 1 that is shown in FIGS. 1a and 1b. However, the positioning system 10 that is shown in FIGS. 2a and 2b differs from the prior art positioning system 1 in that the positioning system 10 does not include potentiometers to detect a change in the orientation of the cover plate 50 relative to the body 80. Instead, the first gear rod 20 and the second gear rod 30 include conductive material. The skilled person would know that the first 20 and second gear rod 30 could include an amount of conductive material so that its internal resistance is high enough to measure a voltage drop along the length of the first gear rod 20 in steps having a resolution of one millimeter, or smaller.

As described above with regard to the prior art positioning system 1, the spring jack 40, which might be a spring comprising metal material, exerts a specific force on the first gear rod 20 and the second gear rod 30 so that when the cover plate 50 is tilted relative to the body 80, the spring jack 40 slides back and forth on the back side of the first gear rod 20 and the second gear rod 30. Thus, the spring jack 40 mechanically and electronically contacts the first gear rod 20 and the second gear rod 30 when it is moving back and forth.

In FIG. 2a, it is shown that a first constant voltage $U_{1\_const}$ is applied between a first end of the first gear rod 20 and the spring jack 40, and a second constant voltage $U_{2\_const}$ is applied between a first end of the second gear rod 30 and the spring jack 40, where the spring jack 30 is used as common ground. As described above, when the cover plate 50 is tilted relative to the body 80, the spring jack 40 slides back and forth on the back side of either or both the first 20 and second 30 gear rods. Therefore, the resistance values of the first and/or the second conductive paths between the connections points on the first gear rod 20 and the spring jack 40, and/or the second gear rod 30 and the spring jack 40, vary with the position of the first 20 and/or second 30 gear rods relative to the spring jack 40.

Here, during operation of the positioning system 10, a resulting first variable current can be determined as a function of the first constant voltage $U_{1\_const}$ and the first resistance value for sensing the position of the first gear rod 20. For example, the tilt angle in the xy-direction could be determined by the first variable current, and/or a resulting first variable current can be determined as a function of the first constant voltage $U_{1\_const}$ and the first resistance value for sensing the position of the first gear rod 20. For example, the tilt angle in the xy-direction could be determined by the first variable current, and/or a resulting second variable current is determined as a function of the second constant voltage $U_{2\_const}$ and the second resistance value for sensing the position of the second gear rod 30. For example, the tilt angle in yz-direction could be determined by the second variable current.

In another example, as shown in FIG. 2b, a first constant current $I_{1\_const}$ could be introduced between the end of the first gear rod 20 and the spring jack 40, and a resulting first variable voltage could be determined as a function of the first constant current $I_{1\_const}$ and the first resistance value to sense the position of the first gear rod 20 as described above. In the same way, a second constant current $I_{2\_const}$ could be introduced between the end of the second gear rod 30 and the spring jack 40 to sense the position of the second gear rod 30. The skilled person would also know that the position of one gear rod can be determined by applying a constant voltage, while the position of the second gear rod can be determined by introducing a constant current.

The positioning system 10 that is shown in FIGS. 2a and 2b also includes a memory board in the form of a PCB board 70 where the contact wires running from the first gear rod 20, the second gear rod 30 and the spring jack 40 are connected to, and an interface 60 for connecting the positioning system 10 to the vehicle control system. However, the skilled person would know that the first gear rod 20, the second gear rod 30 and the spring jack 40 could also be directly connected to an evaluation module located somewhere inside the vehicle, making the PCB board 70 redundant.

The skilled person would know, that for an exact evaluation of the position of the gear rods 20, 30 relative to the spring jack 40, the resistance values of the gear rods 20, 30 should consequently linearly change along their lengths.

However, in practice, the linear resistance value of the gear rods 20, 30 is most likely not always exactly the same in all regions of the gear rods 20, 30, e.g. due to manufacturing issues. Therefore, the memory board of the vehicle control system could comprise a compensation functionality that is adapted to compensate for non-linearities in the conductive material of the gear rods 20, 30. Non-linearities might be due to contamination on the outside of the conductive material, or might be due to impurities in the composition of the conductive material. Also, irregularities in the filling degree of the conductive material, e.g. graphite, carbon fibers, and/or nano-particles, etc. might cause non-linearities. For being able to make a fairly exact determination, it would be desirable, if the maximal resistance of one length unit, $R_{1E}$, along the length of the gear rods 20, 30, would be higher than the total error, $F_{Total}$, of all length units $E_{Total}$ along the length of the gear rods 20, 30, i.e. such that $R_{1E}=F_{Total}*E_{Total}$.

For example, when the length unit is 1 mm, the gear rods 20, 30 are in total 15 mm long, having a total resistance value of 1500Ω. Therefore, each length unit should correspond to a resistance value of 100Ω. In case of a total error of 5 Ω/mm, a total error of 15*5=75Ω would be tolerable, since this value is below the resistance value of 100Ω corresponding to one length unit. However, the skilled person would know that even if the total error would exceed the resistance value of one length unit, the positioning system 10 could still be used to detect a change in the orientation of the cover plate 50 relative to the body 80.

Figure 3:
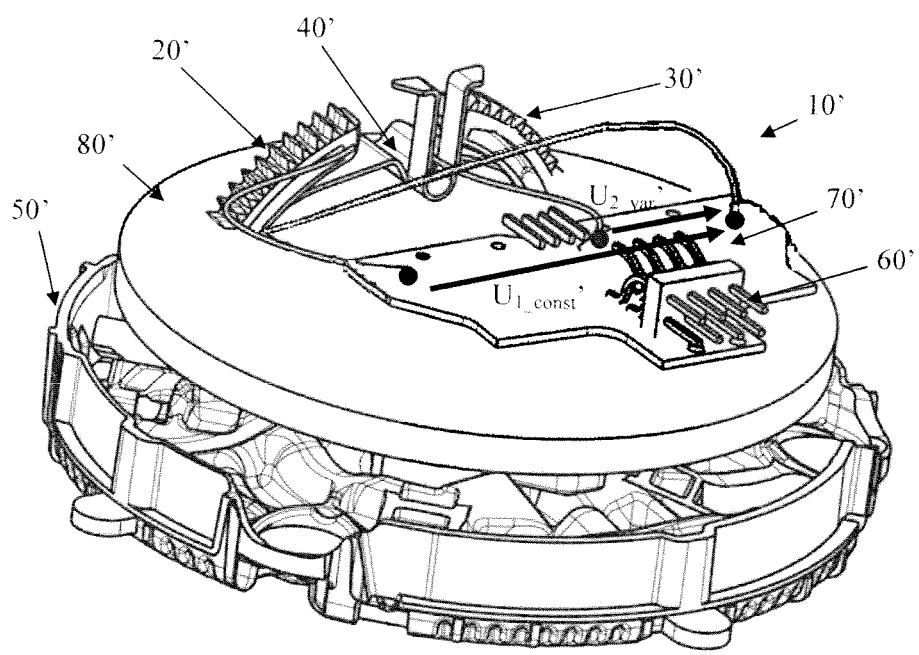
FIG. 3 is a diagram illustrating a schematic view of a positioning system according to a second embodiment of the invention.

FIG. 3 shows a schematic view of a positioning system 10' according to another embodiment of the invention. In the embodiment that is shown in FIG. 3, a first constant voltage $U_{1\_const}'$ is applied between two points close to the two ends of the first gear rod 20'. The arrangement works as a voltage divider, where a second variable voltage $U_{2\_var}'$ can be measured at the spring jack 40'. Depending on the position where the first gear rod 20' is contacted by the spring jack 40', the resulting second variable voltage $U_{2\_var}'$ varies correspondingly.

The features disclosed in the claims, the specification, and the drawings maybe essential for different embodiments of the claimed invention, both separately or in any combination with each other.

REFERENCE SIGNS 1 positioning system (prior art)
2 first gear rod (prior art)
3 second gear rod (prior art)
4 spring jack (prior art)
5 cover plate (prior art)
6 interface (prior art)
7 PCB board (prior art)
8 body (prior art)
9, 9' potentiometer (prior art)
10, 10' positioning system
20, 20' first gear rod
30, 30' second gear rod
40, 40' spring jack
50, 50' cover plate
60, 60' interface
70, 70' PCB board
80, 80' body
$U_{1\_const}$ $U_{1\_const}'$ first constant voltage
$U_{2\_const}$ second constant voltage
$U_{2\_var}'$ second variable voltage
$I_{1\_const}$ first constant current
$I_{2\_const}$ second constant current

The invention claimed is:

1. A positioning system for a rear view display device comprising:
at least a first gear rod for positioning a cover plate, and a second gear rod for positioning the cover plate, the first gear rod and the second gear rod comprising conductive material;
a spring jack comprising conductive material, the spring jack being adapted to contact the first gear rod and the second gear rod;
a position sensing means comprising wiring adapted to sense the position of the first gear rod relative to the spring jack with at least a first resistance value of a first conductive path between at least a first point on the first gear rod and the spring jack varying with a position of the first gear rod relative to the spring jack, and to sense the position of the second gear rod relative to the spring jack with at least a second resistance value of a second conductive path between at least a first point on the second gear rod and the spring jack varying with a position of the second gear rod relative to the spring jack; and
a printed circuit board (PCB),
wherein the wiring comprises a first contact wire which runs from the PCB to an end of the first gear rod, a second contact wire which runs from the PCB to an end of the second gear rod, and a third contact wire which runs from the PCB to the spring jack, the first conductive path running from the first gear rod to the PCB to the spring jack and the second conductive path running from the second gear rod to the PCB to the spring jack, so that the spring jack acts as a common ground for both the first conductive path and the second conductive path.

2. The positioning system of claim 1, wherein
a first constant voltage is applied between the first point of the first gear rod and the spring jack, and a resulting first variable current is determined as a function of the first constant voltage and the first resistance value to sense the position of the first gear rod, or
a first constant current is introduced between the first point of the first gear rod and the spring jack, and a resulting first variable voltage is determined as a function of the first constant current and the first resistance value to sense the position of the first gear rod.

3. The positioning system of claim 2, wherein the position sensing means is adapted to sense a second variable voltage at the spring jack that is at least a fraction of the first constant voltage applied between two points on the first gear rod, and the first constant voltage is applied between two ends of the first gear rod, and
wherein the second variable voltage is detected at the spring jack being a fraction of the first constant voltage applied across the two points on the first gear rod, and the second variable voltage is a function of the position of the first gear rod with respect to the spring jack.

4. The positioning system of claim 1, wherein the first gear rod is adapted to pivot the cover plate around a first pivot axle, and the second gear rod is adapted to pivot the cover plate around a second pivot axle.

5. The positioning system of claim 2, wherein
a second constant voltage is applied between a second point of the second gear rod and the spring jack, and the resulting second variable current is determined as a function of the second constant voltage and a second resistance value of a second conductive path between the second point on the second gear rod and the spring jack to sense the position of the second gear rod, or a second constant current is introduced between the second point of the second gear rod and the spring jack, and the resulting second variable voltage is determined as a function of the second constant current and the second resistance value to sense the position of the second gear rod.

6. The positioning system of claim 1, wherein the spring jack is kept at least one of
stationary in regard to the movement of the first or the second gear rod, the spring jack being located on a body, where the cover plate is kept pivotable relative to the body, and
spring biased against the first or the second gear rod.

7. The positioning system of claim 1, wherein the first or the second gear rod is pivotally attached to the cover plate and comprises a circular arc section.

8. The positioning system of claim 1, further comprising a first motor comprising a first gear adapted to interact with the first gear rod or a second motor comprising a second gear adapted to interact with the second gear rod for positioning the cover plate.

9. The positioning system of claim 1, wherein the spring jack comprises a steel spring, a steel spring comprising an alloy coating, a tapping comprising carbon material, or conductive plastic material.

10. The positioning system of claim 1, wherein the first gear rod or the second gear rod comprises plastic material, obtained by injection molding, and wherein the plastic material comprises
an electrically conductive coating, applied by a screen-printing or roll on technique, wherein the electrically conductive coating is cured after its application, or
the plastic material comprises an electrically conductive material, at least one of nanotubes or carbon particles, dispersed evenly throughout the electrically conductive material so that the resistance of the first or the second gear rod changes essentially linearly along the respective lengths of the first or the second gear rod, and the amount of electrically conductive material leads to an internal resistance of the plastic material being sufficient for allowing measurements with millimeter precision.

11. The positioning system of claim 1, wherein the first or the second gear rod comprise along their length a plurality of length units having a resistance value each, wherein the resistance value of a length unit of the plurality of length units is higher than the total resistance error of all length units of the plurality of length units, wherein the total resistance error of all length units is the sum of deviations from a predefined resistance value for each length unit of the plurality of length units.

12. The positioning system of claim 1, wherein the position sensing means is adapted to directly connect to an evaluation module, or comprises a Printed Circuit board and is adapted to be connected to a Local Interconnect Network Bus system via a corresponding interface.

13. The positioning system of claim 1, wherein the cover plate is adapted to hold or is holding a reflective element, a mirror element, an electrochromic element, a prismatic element, a video screen, or a camera.

14. A rear view display device for a motor vehicle, comprising at least one positioning system according to claim 1.

15. A rear view display device for a vehicle according to claim 14, comprising at least one camera supported by at least one cover plate.

16. A rear view display device for a vehicle according to claim 14, comprising at least one reflective element supported by at least one cover plate.

17. A vehicle, comprising at least one rear view display device according to claim 14.

* * * * *